US005943653A

United States Patent [19]
Ross et al.

[11] Patent Number: 5,943,653
[45] Date of Patent: Aug. 24, 1999

[54] ELECTRONIC COUPON STORAGE AND RETRIEVAL SYSTEM CORRELATED TO HIGHWAY EXIT SERVICE AVAILABILITY INFORMATION

[75] Inventors: Monte Ross, St. Louis; Mark L. Peterson, University City; Leonard R. Missler, Chesterfield, all of Mo.

[73] Assignee: Ultradata Systems, Inc., St. Louis, Mo.

[21] Appl. No.: 08/612,344

[22] Filed: Mar. 7, 1996

Related U.S. Application Data

[63] Continuation-in-part of application No. 08/019,139, Feb. 18, 1993, abandoned, which is a continuation-in-part of application No. 07/676,818, Mar. 28, 1991, Pat. No. 5,229,947, which is a division of application No. 07/410,603, Sep. 21, 1989, Pat. No. 5,021,961.

[51] Int. Cl.[6] .............................. G06F 15/50; G06F 3/02; G06F 13/00
[52] U.S. Cl. .................................... 705/14; 705/5; 705/6; 364/705.01
[58] Field of Search ................................. 705/13, 14, 18, 705/26, 41, 418

[56] References Cited

U.S. PATENT DOCUMENTS

| | | | |
|---|---|---|---|
| 3,845,289 | 10/1974 | French | 235/151.2 |
| 3,925,641 | 12/1975 | Kashio | 235/150.2 |
| 4,145,605 | 3/1979 | Marcus | 235/92 |
| 4,156,912 | 5/1979 | Shigeta et al. | 364/443 |
| 4,189,779 | 2/1980 | Brautingham | 364/718 |
| 4,190,819 | 2/1980 | Burgyan | 340/23 |
| 4,301,506 | 11/1981 | Turco | 364/436 |
| 4,307,859 | 12/1981 | Hayashi et al. | 246/124 |
| 4,312,577 | 1/1982 | Fitzgerald | 353/12 |
| 4,334,278 | 6/1982 | Marmon | 364/709 |
| 4,367,453 | 1/1983 | Kuno et al. | 340/23 |
| 4,371,934 | 2/1983 | Wahl et al. | 364/424 |
| 4,446,528 | 5/1984 | Marmon | 364/709 |

(List continued on next page.)

FOREIGN PATENT DOCUMENTS

| | | |
|---|---|---|
| 0 246 452 A3 | 4/1986 | European Pat. Off. . |
| 0 286 105 A2 | 4/1987 | European Pat. Off. . |
| 0 419 248 A2 | 3/1991 | European Pat. Off. ........ G09B 29/10 |
| WO86/03310 | 6/1986 | WIPO .............................. G06F 7/04 |
| WO89/07800 | 8/1989 | WIPO ............................ G06F 15/40 |

OTHER PUBLICATIONS

In–Store Coupon Vending Units; Quick Frozen Foods; Jun., 1985; p. 44,451.

Val–Pak Coupon, Valid Until Nov. 23, 1988, Lunch Special, Valid 11AM–2PM.

Primary Examiner—Allen R. MacDonald
Assistant Examiner—James W. Myhre
Attorney, Agent, or Firm—Senniger, Powers, Leavitt & Roedel

[57] ABSTRACT

A system for providing data related to discounted services available near a given location. The system includes a memory storing compressed service data representative of a plurality of services in various locations categorized by type of service and compressed coupon data representative of discounts available for the services. The system also includes a book of coupons corresponding to the discounted services wherein the coupon data includes identifying numbers which identify locations of coupons within the coupon book corresponding to the discounts available for the services. A data entry circuit receives and compresses input data identifying a desired category of services and the given location and a microprocessor, receiving and responsive to the compressed input data, selectively retrieves the service data and coupon data from the memory. The retrieved service data represents one or more selected services in the desired category near the given location and the retrieved coupon data represents the discounts available for the selected services including the identifying numbers of the coupons. The microprocessor then expands the retrieved service data and coupon data into a user-readable form and a display displays the expanded retrieved service data and coupon data.

18 Claims, 6 Drawing Sheets

U.S. PATENT DOCUMENTS

| | | | |
|---|---|---|---|
| 4,481,584 | 11/1984 | Holland | 364/424 |
| 4,546,439 | 10/1985 | Esparza | 364/424 |
| 4,553,206 | 11/1985 | Smutek et al. | 364/300 |
| 4,554,446 | 11/1985 | Murphy et al. | 235/487 |
| 4,570,227 | 2/1986 | Tachi et al. | 340/995 |
| 4,670,853 | 6/1987 | Stepien | 364/70 |
| 4,674,041 | 6/1987 | Lemon et al. | 364/401 |
| 4,713,661 | 12/1987 | Boone et al. | 340/994 |
| 4,720,785 | 1/1988 | Shapiro | 364/401 |
| 4,723,212 | 2/1988 | Mindrum et al. | 364/401 |
| 4,729,127 | 3/1988 | Chan et al. | 382/56 |
| 4,737,927 | 4/1988 | Hanabusa et al. | 364/443 |
| 4,737,929 | 4/1988 | Denker | 364/807 |
| 4,744,033 | 5/1988 | Ogawa et al. | 364/443 |
| 4,757,455 | 7/1988 | Tsunoda et al. | 364/449 |
| 4,757,456 | 7/1988 | Benghiat | 364/464 |
| 4,882,675 | 11/1989 | Nichtberger et al. | 364/401 |
| 4,896,791 | 1/1990 | Smith | 221/7 |
| 4,910,672 | 3/1990 | Off et al. | 364/405 |
| 4,949,256 | 8/1990 | Humble | 364/401 |
| 4,951,212 | 8/1990 | Kurihara et al. | 369/449 |
| 4,962,457 | 10/1990 | Chen et al. | 364/443 |
| 4,972,504 | 11/1990 | Daniel, Jr. et al. | 455/2 |
| 5,008,519 | 4/1991 | Cunningham et al. | 235/383 |
| 5,117,355 | 5/1992 | McCarthy | 364/405 |
| 5,128,752 | 7/1992 | Kohorn | 358/84 |
| 5,192,854 | 3/1993 | Counts | 235/375 |
| 5,229,947 | 7/1993 | Ross et al. | 364/443 |
| 5,289,572 | 2/1994 | Yano et al. | 395/155 |
| 5,314,176 | 5/1994 | Schmitt | 270/1 |
| 5,557,721 | 9/1996 | Fite et al. | 395/148 |

ELECTRONIC COUPON STORAGE AND RETRIEVAL SYSTEM CORRELATED TO HIGHWAY EXIT SERVICE AVAILABILITY INFORMATION

CROSS-REFERENCE TO RELATED APPLICATIONS

This application is a continuation-in-part of commonly assigned application Ser. No. 08/019,139 filed Feb. 18, 1993 (abandoned), which is a continuation-in-part of commonly assigned application Ser. No. 07/676,818 filed Mar. 28, 1991 (now U.S. Pat. No. 5,229,947), which is a division of commonly assigned application Ser. No. 07/410,603 filed Sep. 21, 1989 (now U.S. Pat. No. 5,021,961), the entire disclosures of which are incorporated herein by reference.

NOTICE

Copyright© 1996 Ultradata Systems, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

The present invention relates to a data processing device and, in one form, to a data processing device for providing data related to the types of services and applicable discounts available at selected locations in response to user input. The device is preferably hand-held and may be used within a system wherein a corresponding device is located at each service for interfacing with the hand-held device to monitor and control usage of discounts at the services. For applications involving large volumes of data, the data is stored and retrieved in a compressed form in the hand-held device and then expanded for display in a user-readable form.

To determine what types of services and discounts are available in a location along a highway, for example, one has to either depend upon billboards along the highway or leave the highway in order to locate a specific type of service. It is not unusual that a motorist may leave the highway in an attempt to locate a particular gas station or food store only to find out later that a similar station or store was only a few miles down the highway. Additionally, maps are used to locate various types of services. However, the maps may be out of date or at best contain only limited information concerning the types of services available along the highway, are often unwieldy and are often difficult to read.

Various devices have been developed which provide information relating to services available along a highway. However, these devices require different interchangeable ROM (read only memory) packs or modules be used for either different highways or different states and most do not provide discount information. Further, since these devices are organized by highways or states, it is difficult to determine the nearest service to a border area or major intersection without frequently changing modules. This is because such devices are unable to identify services across borders. It would be advantageous to have a device which did not require separate modules to store information and changing modules when information concerning a different highway is required or when a motorist reaches a state border.

In addition to locating a service, there is also the question whether the service offers a discount coupon. Coupon books are commonly found; however, it is often difficult to locate a particular coupon for a particular service at the time of purchase. A coupon for a small business or chain franchise location is often lost among the myriad of available coupons. There is a need for a device which allows a particular coupon in a coupon book or collection of randomly sequenced coupons to be directly accessed through the user's location or through identification of a selected service so that a coupon for the selected service is highlighted to the user. Such a device could change the dynamics of the marketing decision as to whether it is economical for a small business to offer a discount in a coupon book. There is also a need for electronic storage of coupon data as a discount which can be retrieved and displayed at a selected service so that all of the usual paperwork and searching for paper coupons involved in presenting coupons for purchases is eliminated.

In addition to discount and service information, there are many situations where large volumes of data must be routinely accessed. Such applications include the data in a telephone book or encyclopedia and the vast data available relating to travel information, scientific information, manufacturing processes, service parts information, repair procedures, literature, geography, history, cultures, foreign languages, and the like. It would be advantageous to have a hand-held device which could store and retrieve large volumes of data quickly without the need for separate memory modules.

SUMMARY OF THE INVENTION

Among the objects of the present invention is the provision of a data processing device which stores and retrieves data in a compressed form; the provision of a data processing device which compresses user-entered data for comparison with compressed data stored in the device; the provision of a data processing device which stores data related to the availability of discount coupons for use at selected services along a highway; the provision of a data processing device which stores data related to the availability of discount coupons for use at selected services; the provision of a data processing device which identifies the location of a particular coupon within a coupon book; and the provision of a data processing device for providing data related to the availability of discounted services within a given location.

Generally, a system embodying aspects of the invention provides data related to discounted services available near a given location. The system includes a memory storing compressed service data representative of a plurality of services in various locations categorized by type of service and compressed coupon data representative of discounts available for the services. The system also includes a book of coupons corresponding to the discounted services wherein the coupon data includes identifying numbers which identify locations of coupons within the coupon book corresponding to the discounts available for the services. A data entry circuit receives and compresses input data identifying a desired category of services and the given location and a microprocessor, receiving and responsive to the compressed input data, selectively retrieves the service data and coupon data from the memory. The retrieved service data represents one or more selected services in the desired category near the given location and the retrieved coupon data represents the discounts available for the selected services including the identifying numbers of the coupons. The microprocessor then expands the retrieved service data and coupon data into a user-readable form and a display displays the expanded retrieved service data and coupon data.

Another form of the invention is directed to a system for providing data related to discounts available for selected services. The system includes a memory storing compressed coupon data representative of discounts available for a plurality of services, each of the discounts being related to at least one of the services. The system also includes a book of coupons corresponding to the discounts wherein the coupon data includes identifying numbers which identify locations of coupons within the coupon book corresponding to the discounts available for the services. A data entry circuit receives and compresses input data identifying a selected service and a microprocessor, receiving and responsive to the compressed input data, selectively retrieves the coupon data from the memory. The retrieved coupon data represents the discounts available for the selected service including the identifying numbers of the coupons. The microprocessor then expands the retrieved coupon data into a user-readable form and a display displays the expanded retrieved coupon data.

Yet another form of the invention is a data processing system for providing data related to the availability of discounted services within a given location. The system includes means for storing compressed service data identifying services available in various locations and compressed coupon data identifying discounts available for various services. The system further includes means for relating the coupon data to the service data, a memory, means for entering input data in the memory identifying a desired category of service and the given location, and means for compressing the input data. The system also includes means for retrieving from the storing means service data representing one or more services near the given location and for retrieving from the storing means coupon data representing discounts available for the retrieved services. The system further includes means for expanding the retrieved compressed service and coupon data into a user readable form and means for displaying the expanded retrieved service and coupon data. The system may be used with a book of coupons corresponding to the discounts applicable to the services, wherein the storing means includes means for storing coupon data in the form of a coupon number identifying each of the coupons in the book, and wherein the retrieving means includes means for retrieving the coupon number for the coupon in the book applicable to the desired service.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
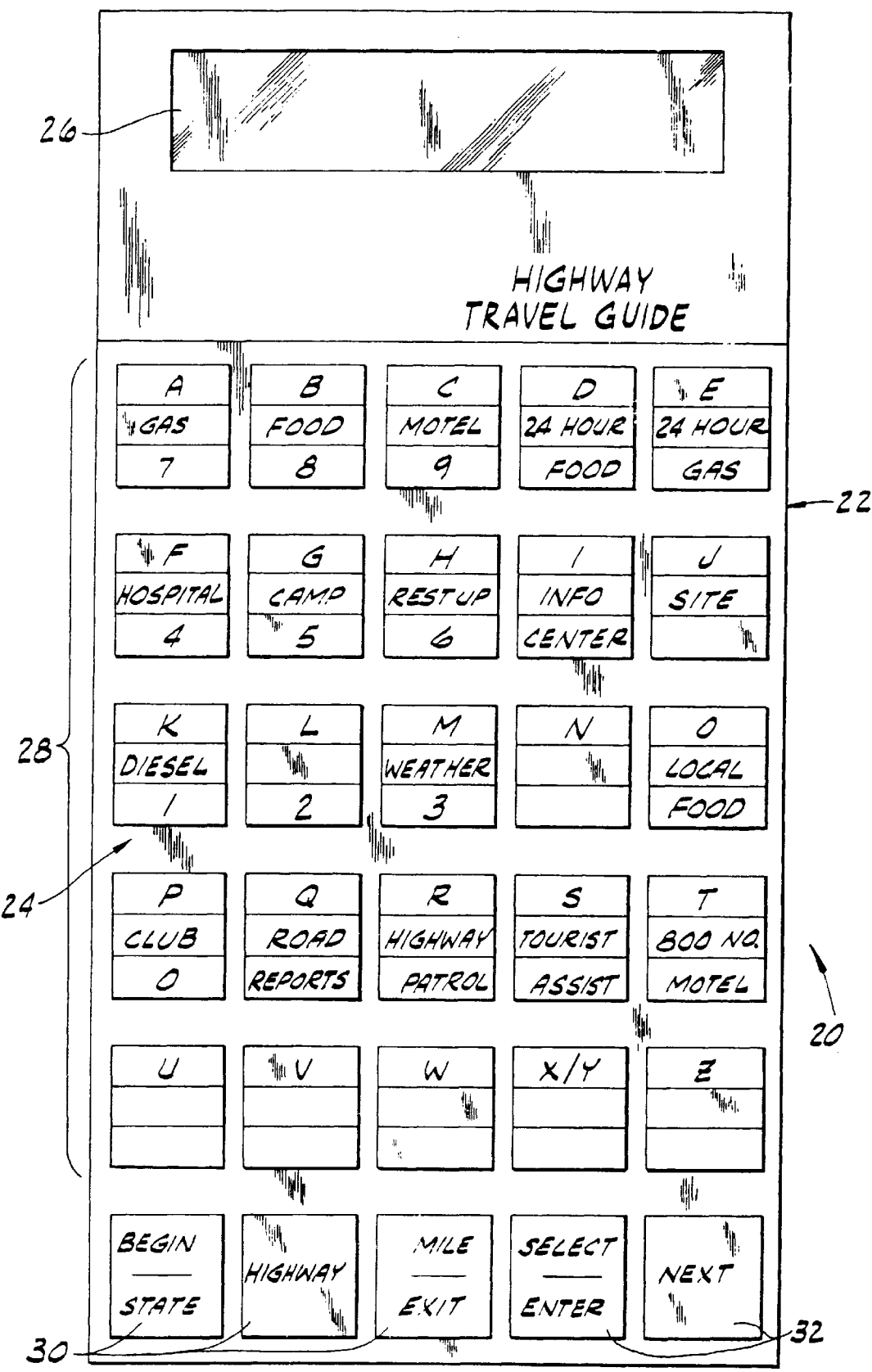
FIG. 1 is a front view of a data processing device of the present invention.

Referring now in particular to FIG. 1, a data processing device 20 is a hand-held unit having a housing 22 which includes a keyboard 24 and an alphanumeric display 26. The keyboard 24 includes alphanumeric keys 28, input function keys 30, and control keys 32. The alphanumeric keys 28 are also labeled with other information such as a particular category or type of service.

Figure 2:
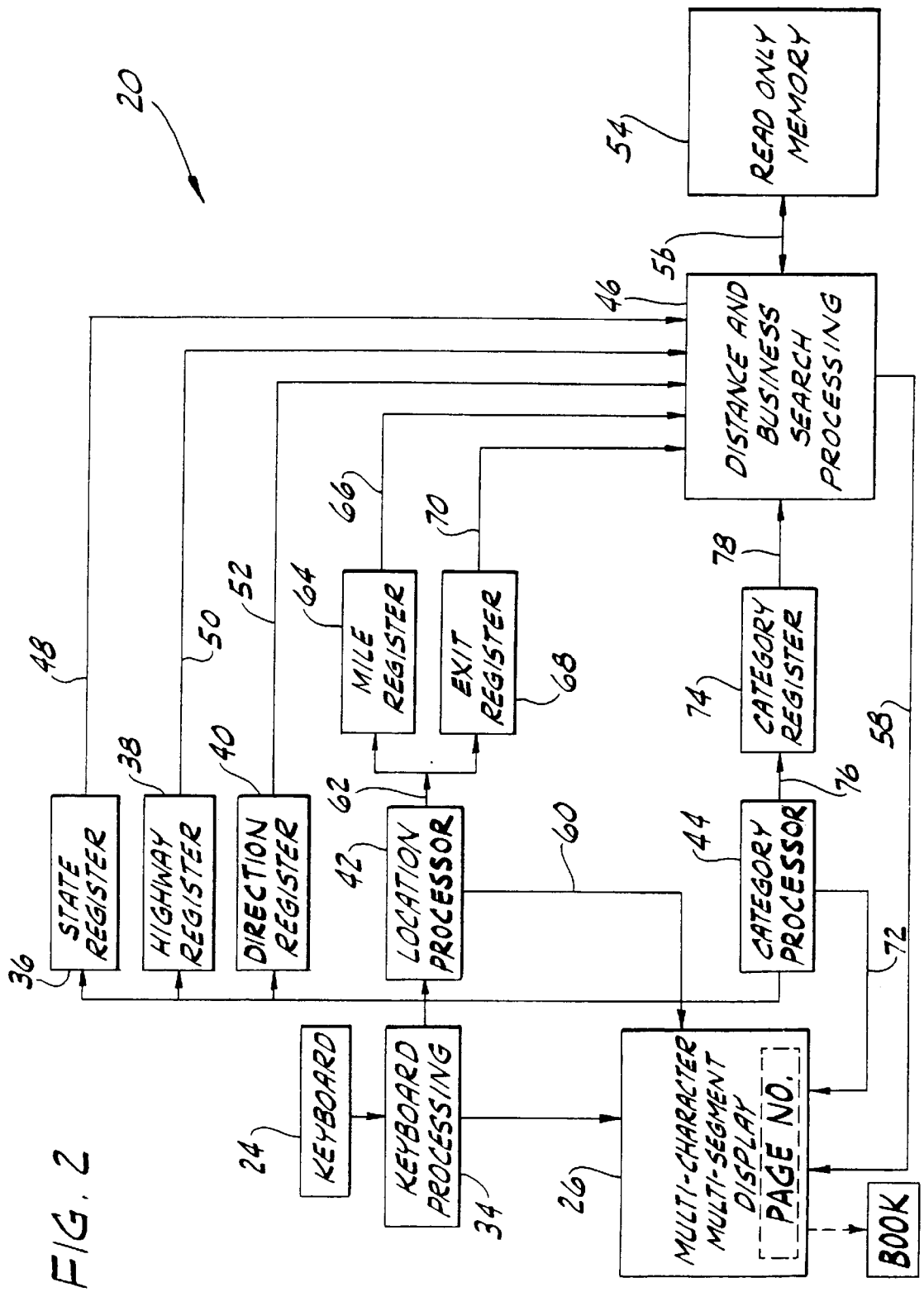
FIG. 2 is a block diagram of the data processing device shown in FIG. 1.

FIG. 2 illustrates a functional block diagram of the components of the device 20. The keyboard 24 is connected to a keyboard processor 34. The keyboard processor 34 periodically scans keyboard 24 to detect for the occurrence of a key depression. Upon detecting the depression of a key, keyboard processor 34 reads in the key and provides this to both the display 26 and either a state register 36, a highway register 38, a direction register 40, a location processor 42, or a category processor 44. The state register 36, the highway register 38, and the direction register 40 are connected to a microprocessor 46 via lines 48, 50, and 52, respectively. The microprocessor 46 which is particularly suitable for this invention is an NEC 7514, although there are a variety of other microprocessors which may be suitable for this invention if properly programmed and connected. The microprocessor 46 is connected to a read only memory (ROM) chip 54 via address lines 56. In a preferred embodiment, the ROM chip 54 is a one megabit ROM chip supplied by a number of chip manufacturers, such as Toshiba, NEC, and Sharp. Larger size ROM chips may be used to contain additional information. Alternatively, the predetermined data in ROM 54 and accessed by microprocessor 46 may be replaced by data stored in an EPROM, one-time programmable memory, flash memory or other similar storage device which can be accessed by microprocessor 46. The microprocessor 46 is also connected to display 26 via line 58.

The location processor 42 is connected to display 26 via line 60. If mileage information is entered from keyboard 24, location processor 42 provides this information over a line 62 to a mile register 64. The mile register 64 is connected to microprocessor 46 via line 66. If exit information is entered from keyboard 24, location processor 42 provides this information over line 62 to an exit register 68. The exit register 68 is connected to microprocessor 46 via line 70.

The category processor 44 is connected to display 26 via line 72. The category processor 44 provides category information entered from keyboard 24 to a category register 74 via line 76. The category register 74 is connected to microprocessor 46 via line 78.

According to the invention, keyboard 24 and keyboard processor 34, in combination with state register 36, highway register 38, direction register 40 or location processor 42 and in combination with category processor 44, constitutes a data entry circuit for receiving and compressing input data identifying a desired category of services and the given location.

In order to store the large amount of data for the types of services and related coupons available at locations along the highway, device 20 stores data in ROM 54 in a compressed form. Data compression is implemented by use of numerous tables, pointers, and keywords. There are three major tables which are the keyword tables, the highway tables, and the exit tables. Each type of service has its own keyword table. There is a keyword table for each service listed on keys 28 of keyboard 24. For example, there are separate keyword tables for gas, food, and motels. Each keyword table contains a list of up to 63 different eight character names. TABLE I shows an example of a keyword table for hotels. The first entry in the table is for HOLIDAY which represents Holiday Inn hotels, the second entry is for HOWARD for Howard Johnsons, and the last entry is for WESTIN. The numeral 255 represents that the end of the table has been reached.

TABLE I

| HOTEL KEYWORDS | |
| --- | --- |
| first entry | (H) (O) (L) (I) (D) (A) (Y) ( ) |
| second entry | (H) (O) (W) (A) (R) (D) ( ) ( ) |
| . | . |
| . | . |
| . | . |
| last entry | (W) (E) (S) (T) (I) (N) ( ) ( ) |
| end of table | (255) |

The highway tables contain lists of all the highways in each state. Data stored in the highway tables consist of the two-letter state abbreviation (2 bytes) and eight characters for the state name (8 bytes). This data represents a header for each state highway table. Each state highway table also includes four characters for the highway name (4 bytes), one byte describing the highway direction and compass heading for increasing mile/exit markers, the maximum mile marker and maximum exit number for the particular highway in the state (2 bytes), a pointer to an exit table for the highway (1 byte), and the numbers of states where the highway comes from and goes to (2 bytes). Thus, each highway is completely described by using only 10 bytes. TABLE II shows an example of a highway table for the first state listed.

TABLE II

| HIGHWAY DATA | |
| --- | --- |
| Alabama highways | (A) (L) (A) (L) (A) (B) (A) (M) (A) ( ) |
| first entry | (a) (b) (c) (d) (CODE A) (lsb max mile) |
| | (lsb ET pntr) (msb ET pntr) |
| | (entrance state #) (exit state #) |
| second entry | (a) (b) (c) (d) (CODE A) (lsb max mile) |
| | (lsb ET pntr) (msb ET pntr) |
| | (entrance state #) (exit state #) |
| . | . |
| . | . |
| . | . |
| end of table | (255) | where (a)(b)(c)(d) is the name of the highway. CODE A has eight bits which are defined as follows: bit 7 represents the page for the exit table pointer, bits 4, 5, and 6 are spare, bits 2 and 3 represent the direction the user is moving on the highway, and bits 0 and 1 represent the most significant bits for the maximum mile marker in the state (the maximum mile marker is never greater than 999). TABLE IIa shows exemplary direction designations for bits 2 and 3.

TABLE IIa

| BIT 3 | BIT 2 | HIGHWAY DIRECTION |
| --- | --- | --- |
| 0 | 0 | Increasing North |
| 0 | 1 | Increasing South |
| 1 | 0 | Increasing East |
| 1 | 1 | Increasing West |

The exit table stores a four byte descriptor for each exit as well as two bytes for every service at each exit. For each service which offers a coupon, the exit table stores an additional two bytes representing a coupon reference number. For example, if there are 244 different highways in a state, there will be 244 different exit tables, one for each highway in the state. By use of pointers, each service is completely described by compressing information into two bytes. The four byte exit header contains data relating to the number of services at this exit and the preceding exit, the exit letter code (e.g., Exit 12B), and the mile marker number and exit number associated with the exit. TABLE III is an example of an exit table for a particular highway.

TABLE III

| EXIT TABLE | |
| --- | --- |
| first exit on highway | (CODE B) (lsb exit #) (CODE H) |
| first service | (CODE F) (CODE G) |
| second service | (CODE F) (CODE G) |
| . | . |
| . | . |
| . | . |
| last service | (CODE F) (CODE G) |
| second exit on highway | (CODE B) (1st exit #) (CODE H) |
| . | . |
| . | . |
| . | . |
| end of table | (255) |

CODE B includes bits 4, 5, 6, and 7 which represent the most significant bits for the number of services at the exit, bits 2 and 3 represent the most significant bits for the exit number (999 is the maximum), and bits 0 and 1 represent the most significant bits for the mile marker number (999 is the maximum). CODE H includes bit 7 which represents the least significant bit for the number of services at the exit, bits 5 and 6 which represent the exit letter, and bits 0, 1, 2, 3, and 4 which represent the number of services at the preceding exit. TABLE IIIa shows exemplary exit letter designations for bits 5 and 6.

TABLE IIIa

| BIT 6 | BIT 5 | EXIT LETTER |
| --- | --- | --- |
| 0 | 0 | none |
| 0 | 1 | A |
| 1 | 0 | B |
| 1 | 1 | C |

The CODE F and CODE G bytes describe each service including the service type code number, the distance off the highway where the service is located, the direction off the highway, the reference number of any available coupon for the service, and the service keyword number (a pointer to the appropriate keyword table). Each service is described by using only two bytes. Preferably, there is only a select list of possible choices in each service category. For example, the fast foods service category may only include Burger King, Wendy's, and McDonald's. It takes a limited number of bits to select a name rather than the amount of memory it would take to uniquely describe the name of the service each time. If there are 30 fast food chains, each keyword can be selected by using only 5 bits. Otherwise, it could take up to 1 byte for each alphanumeric character or as much as 64 bits for an 8 character display to describe the service. The compression of data by using keywords enables a greater amount of data to be stored in ROM 54.

CODE G includes bits 6 and 7 which represent the direction off the highway in which the service is located and bits 0–5 which represent either the direction off the highway in which a rest area or information center is located or the name keyword number. TABLE IIIb shows exemplary direction designations for bits 6 and 7 and TABLE IIIc shows exemplary direction designations for bits 0–5.

TABLE IIIb

| BIT 7 | BIT 6 | DIRECTION OFF HIGHWAY |
|---|---|---|
| 0 | 0 | north |
| 0 | 1 | south |
| 1 | 0 | east |
| 1 | 1 | west |

TABLE IIIc

| BIT 5 | BIT 4 | BIT 3 | BIT 2 | BIT 1 | BIT 0 | DIRECTION OF REST AREA |
|---|---|---|---|---|---|---|
| X | X | X | X | 0 | 0 | not allowed |
| X | X | X | X | 0 | 1 | northbound/eastbound |
| X | X | X | X | 1 | 0 | southbound/westbound |
| X | X | X | X | 1 | 1 | exit good | where "northbound/eastbound" indicates that there is only a northbound exit for a N/S highway or an eastbound exit for an E/W highway; "southbound/westbound" indicates that there is only a southbound exit for a N/S highway or a westbound exit for an E/W highway; and "exit good" indicates that both directions of traffic have an exit.

CODE F includes bits 0–4 which represent the service type, bits 5–6 which represent the distance off the highway to where the service is located, and bit 7 which indicates whether the service has a coupon available for receiving a discount from the service. TABLE IIId shows exemplary distance off the highway and coupon information designations for bits 5–7.

TABLE IIId

| BIT 7 | BIT 6 | BIT 5 | DISTANCE OFF HIGHWAY, COUPON INFORMATION |
|---|---|---|---|
| 0 | 0 | 0 | 0 miles, no coupon |
| 0 | 0 | 1 | 1 mile, no coupon |
| 0 | 1 | 0 | 2 miles, no coupon |
| 0 | 1 | 1 | 4 miles, no coupon |
| 1 | 0 | 0 | 0 miles, coupon available |
| 1 | 0 | 1 | 1 mile, coupon available |
| 1 | 1 | 0 | 2 miles, coupon available |
| 1 | 1 | 1 | 4 miles, coupon available |

If bit 7 indicates that a coupon is available for the service, then the next two succeeding byte pairs (CODE F and CODE G) represent the coupon reference number for identifying and locating the coupon in a book of coupons 80 (see FIG. 2). CODE F bits 0–3 represent the least significant binary coded decimal (BCD) digit of the coupon number. CODE F bits 4–7 represent the BCD tens digit of the coupon number. CODE G bits 0–3 represent the most significant BCD digit of the coupon number for coupon numbers extending up to 999. CODE G bits 4–7 are spare bits, but can be used for the thousands digit if it is necessary to extend the coupon number up to 9999. The coupon data is thereby related to the service data.

TABLE IIIe shows a partial listing of exemplary service type designations for bits 0–4.

TABLE IIIe

| BIT 4 | BIT 3 | BIT 2 | BIT 1 | BIT 0 | SERVICE TYPE |
|---|---|---|---|---|---|
| 0 | 0 | 0 | 0 | 0 | Food |
| 0 | 0 | 0 | 0 | 1 | Gas |
| 0 | 0 | 0 | 1 | 0 | Hospital |
| 0 | 0 | 0 | 1 | 1 | Diesel |
| 1 | 1 | 1 | 1 | 1 | Special use (do not use) |

Miscellaneous other tables are used to store related data, such as a keyword pointer table to identify where in ROM 54 each keyword table is located, a display code table which is used to convert the compressed display code bits into user-identifiable characters on display 26. Additionally, there is a state number table where, for example, 0 represents the state of Alabama and 49 represents the state of Wyoming. There is also included telephone number/vicinity tables for such categories as road conditions and tourist assistance which include the telephone numbers the user may need.

The ROM 54 is divided into pages with each page containing up to 64 k bytes of data. All pointers to the memory locations in ROM 54 include a page field to specify the particular 64 k byte page where the data is located.

In the embodiment of the invention in which the coupon option of device 20 allows the user to identify highway services that offer discounts, device 20 is preferably used in conjunction with the related coupon book 80 containing a number of coupons. In this embodiment, device 20 identifies services with an "*" in the last character of the business name display that have corresponding coupons in accompanying coupon book 80. If the user selects this particular service, display 26 displays the page number of coupon book 80 that contains the coupon corresponding to the service. As an example, if the user searches for restaurant locations along the highway and locates a Denny's restaurant, display 26 will read, for example: "DENNY'S*"; "COLUMBIA"; "MO 71MI"; "1.2 HRS". The "*" indicates that Denny's offers a discount coupon. If the user selects this particular service, display 26 will read, for example: "EXIT 126"; "N 0 MI"; "PAGE 148". In this instance, "PAGE 148" indicates the page number of the available coupon in related coupon book 80.

To access the coupon information in ROM 54 according to this embodiment of the invention, CODE F and CODE G bytes are modified as follows: If the least significant bits (i.e., bits 3–0) of the CODE F byte equals "1100", then the following CODE F and CODE G bytes represent a service that offers coupons. The coupon page number is also stored in the first CODE F and CODE G bytes. TABLE IV shows an example of the CODE F and CODE G bytes for implementing the page number identification feature:

TABLE IV

PAGE NUMBER CODES

| CODE F | b3–b0 | if equal to "1100", then next CODE F and CODE G byte pair represent a service that has a coupon |
| --- | --- | --- |
| | b7–b4 | most significant BCD digits of coupon page number |
| CODE G | b7–b0 | least significant BCD digits of coupon page number |
| CODE F | b7–b0 | standard service type, distance, and direction information for service (this service has a |

TABLE IV-continued

PAGE NUMBER CODES

| | | coupon) |
|---|---|---|
| CODE G | b7–b0 | standard service name keyword number |

The microprocessor 46 executes a program for operating device 20. In operation, microprocessor 46 automatically initiates the program upon application of power to device 20. Application of power also results in device 20 being reset and the initialization of all registers. At first, device 20 is in a low power mode with display 26 off. Periodically, keyboard processor 34 scans keyboard 24 to determine if the begin/state key of input function keys 30 has been pressed. Upon the detection of a pressed begin/state key, device 20 reads in the next two pressed keys as the state code, searches ROM 54 for the state number and stores this number in state register 36. Next, a list of the highways in the particular state selected is read from ROM 54 and displayed. The user selects the highway upon which information is to be requested. This highway number is stored in highway register 38. The next key depression represents the direction being traveled and this is checked against data stored in the highway table in ROM 54 to ensure consistency. The location processor 42 accepts either an exit number or a mile marker number which the user enters via keyboard 24. This data is stored in either mile register 64 or exit register 68 depending upon the type of data entered. Again, for consistency, the entered data is checked against data stored in the exit table in ROM 54.

At this point, all location registers have been initialized and device 20 is ready for the user to request service information. The category processor 44 verifies that a valid service category has been requested. The service type code is stored in category register 74. Once all the registers contain valid entries, microprocessor 46 scans to the appropriate exit table in ROM 54 to locate the requested service data. The program also includes the capability of switching to a new exit table when state boundaries are crossed.

A more detailed explanation of the program executed by microprocessor 46 follows. Microprocessor 46 automatically initiates the program upon application of power to device 20. A state counter register in microprocessor 46 is initialized to 0. The display 26 will read "STATE - -" which prompts the user to enter the two-letter abbreviation for the state (for example, AZ for Arizona) in which information is to be requested. Microprocessor 46 will then scan through the highway table to find a match. If a state is not found, then display 26 will read "ERROR", otherwise the state number will be stored in state register 36. Microprocessor 46 will then retrieve the next 8 characters from the highway table. The display 26 will show these 8 characters which corresponds to the state name (for example, ARIZONA). Microprocessor 46 will wait 1 second and then cause display 26 to display the HIGHWAY prompt. Once HIGHWAY is displayed, the user presses the Highway key on keyboard 24 to scroll through all the highways in the particular state selected. Pressing the Highway key causes microprocessor 46 to read the next four characters from the highway table which represents the name of the highway. The next six bytes of data in the highway table are also retrieved and stored in microprocessor 46. This provides a pointer to the exit table for that highway. Scrolling is accomplished by pressing the Highway key until the desired highway is displayed. If the user presses the Highway key, microprocessor 46 retrieves, displays and temporarily stores the next ten characters of data from the highway table as above. When the user scrolls to the desired highway, the Select key is pressed. As a result, the origin position of the user has been input. Alternatively, the origin position may be input via a unit, such as a computer resident in a car, which communicates with a satellite providing position information.

The display 26 then shows "DIR -" to prompt the user to enter which direction on the highway the user is traveling. The user may enter either E, W, N, or S for the direction. Microprocessor 46 verifies that the highway actually runs in the direction selected. The direction code E, W, N, or S is displayed until the key depressed is released. The device 20 then prompts the user to enter the mile marker number by displaying "MILE - - -" in display 26. The user has the option of either entering the number of the nearest mile marker and then pressing the Select key or pressing the Mile/Exit key to enter the exit number and then pressing the Select key. If the mile marker number is entered, device 20 verifies that the entered number is less than the maximum mileage number for the selected highway in the entered state. If not, an "INVALID" message is displayed. If the exit number is entered, microprocessor 46 searches through the selected highway's exit table to verify that the entered exit number is a valid exit number.

A pointer to the exit table was stored when the highway data was read from the highway table. Microprocessor 46 uses this pointer to retrieve the first four bytes of data from the exit table. The first four bytes contain data related to the number of services at the current exit, the number of services at the preceding exit, the exit number for this exit, the mile marker number for this exit, and the exit number letter, if any. An exit number letter may be A, B, or C. If the current exit number does not match the entered exit number, then microprocessor 46 skips over the service data bytes for this exit and retrieves the next four bytes from the exit table. This process continues until an exit number match is found or until the end of the exit table is encountered. If no exit number match is found, then the message "NOT EXIT" is displayed.

Microprocessor 46 then prompts the user to select a service by causing "CATEGORY" to be displayed in display 26. The user selects a category. Each category key has three corresponding bytes of data stored in ROM 54 starting at hexadecimal address 0003. The correct three bytes are found by multiplying the selected key code by 3 and adding to the 0003 address. These three bytes of data provide a pointer to the keyword tables and a service type code for the selected key. For example, if the user selects the FOOD category key, display 26 of device 20 displays "FOOD - -" prompt and the program is pointed to the keyword table for chain restaurants.

At this point, the user has two choices on how to proceed. The user can either press the Next key and microprocessor 46 will retrieve the name and location of the next restaurant along the highway, or enter alphabetic characters until a combination of letters has been entered which uniquely determines a restaurant name.

If the first choice is selected, microprocessor 46 determines whether the next exit mileage is greater than or equal to the entered mile marker number. If not, microprocessor 46 sequences through the highway's exit table until it finds such an exit. Service data follows the first four bytes of exit data. Each service is represented by a two byte code which provides the service type and name codes and data related to the direction off the highway, the distance from the exit, and whether a coupon is available for the service. When a coupon is available, the two next succeeding bytes identify the coupon reference number. Microprocessor 46 sequences through the service data until it finds a service that matches the selected service type. If a match cannot be found for an exit, microprocessor 46 advances to the next exit and continues to search for the service type. This process continues until either a match is found, the highway ends, or 999 miles from the user's entered location has been searched.

If a match is found, the program is pointed to the start of the keyword name table for the selected service type. This table contains 8 characters of the service name. Microprocessor 46 reads through the table until the service name corresponding to the service name code is found. The service name is then displayed for 1 second. If a coupon is available for the service, an asterisk or other identifying symbol is displayed next to the service name. Microprocessor 46 then calculates the distance to the service by subtracting the user's entered mile marker number from the service exit mileage. This result is displayed along with the state abbreviation where the service is located for 1 second. These displays alternate until the Next key is pressed or until the Select key is pressed. If the Next key is pressed, the next service of the selected service type is found and displayed in the same manner as described above. If the Select key is pressed, device 20 displays the exit number for the selected service on display 26 for 1 second and then alternatively displays the direction off the highway the service is located and the distance off the highway the service is located. These displays are alternated until the Next key is pressed and the next service of the selected service is found and displayed. When a coupon is available for a selected service, the coupon reference number, or page number in related coupon book 80, is alternatively displayed with the exit number and the direction/distance information.

If the user decides to enter the name of a particular service, then the alphabetic keys are pressed. The display 26 blanks and the character is left justified in display 26. Microprocessor 46 then searches the service type keyword table to determine if one and only one service name begins with this letter. If no service name in the keyword table begins with this letter, device 20 displays "NO DATA" for 1 second and then displays the "CATEGORY" prompt again.

If one and only one service name in the keyword tables begins with the entered letter, this service name is displayed. Microprocessor 46 continues execution of the program in the same manner as above except that each service at an exit is checked to match the service name as well as the service type.

If more than one service name in the keyword table begins with the entered letter, microprocessor 46 waits until another letter is entered. This second letter is then displayed and microprocessor 46 searches in the same manner as in the case of the first entered letter. This process continues until a unique code is entered to select one service name from the keyword table.

Figure 3A:
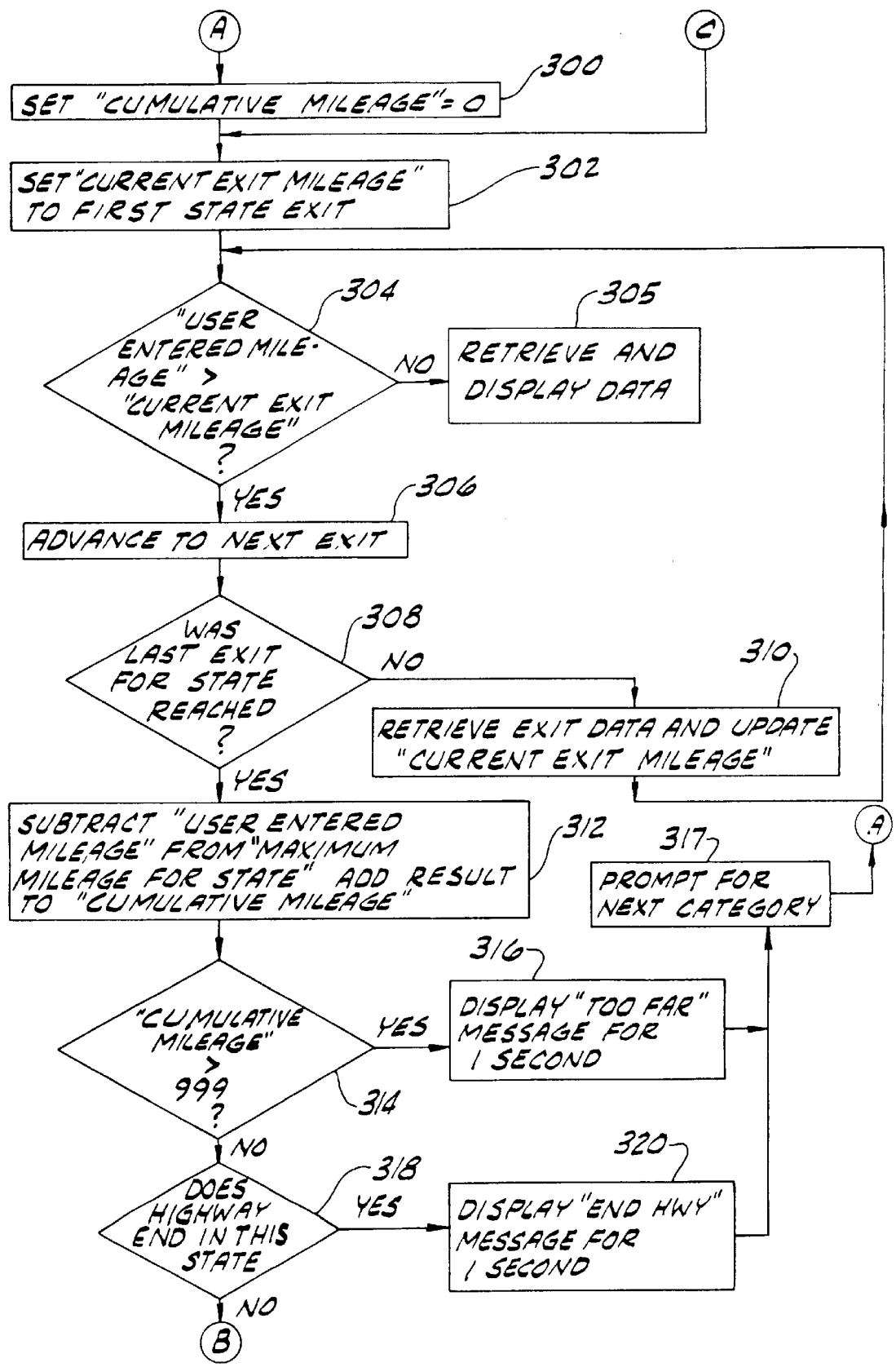
FIGS. 3A–3D are a flow chart of a program of the invention for advancing to the exit table in the next state when the selected service is located in another state.
Figure 3B:
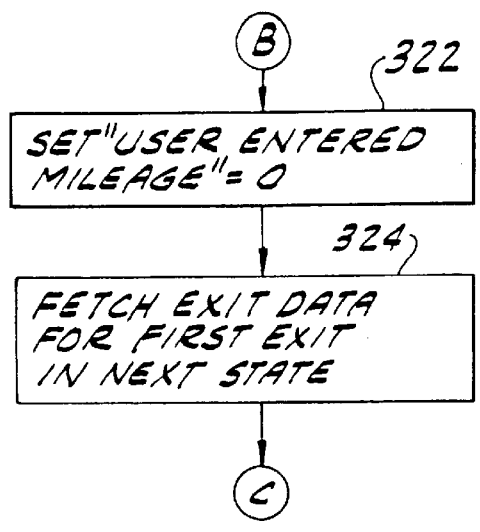

Referring now to FIGS. 3A and 3B, there is shown a flow chart of an exemplary program executed by microprocessor 46 for advancing to the exit table in the next state when the selected service is located in another state. The program takes into account that the user is travelling in a forward direction (successive mileage markers along the highway show increasing mileage). The program begins in a step 300 by setting a cumulative mileage register to zero. In a step 302 a current exit number register is set equal to the first exit's mileage marker number. In a next step 304, microprocessor 46 determines whether the user-entered mileage is greater than the current exit mileage. If no, then the program branches to a step 305 to process the category selected by retrieving and displaying data. The control of the program then loops back to entry selection. If yes, then the program continues to a step 306. In step 306, the program advances to the next exit. In a next step 308, microprocessor 46 determines whether the last exit for the state has been reached. If no, the program branches to a step 310 where the exit data is retrieved and the current exit mileage register is updated. The program then loops back to step 304.

If microprocessor 46 determines in step 308 that the last exit in the state has been reached, the program continues to a step 312. Since the last exit in the state has been reached, the user has requested exit data in the contiguous state. The cumulative mileage register is set equal to the mileage at the boundary or border between the states less the user-entered initial location mileage. Within the second state, the distance from the user's initial location to a desired exit is the exit's mileage plus the cumulative mileage register.

In a next step 314, microprocessor 46 determines whether the value in the cumulative mileage register is greater than 999. If it is, then the program branches to a step 316 where microprocessor 46 causes a "TOO FAR" message to be displayed for 1 second in display 26. According to the program, in a step 317, device 20 then prompts the user to enter or select a next category. After the user enters a new category, the program loops back to point A. On the other hand, if the cumulative mileage register is less than 999, then the program continues to a step 318. In step 318, microprocessor 46 determines whether the highway ends in the current state. If it does, then the program branches to a step 320 causing display 26 to display an "END HWY" message for 1 second. Following step 320, microprocessor 46 proceeds to step 317 of the program. If the highway does not end in the state, the program continues to a point B in FIG. 3B. At point B the program continues to a step 322. In step 322, a user-entered mileage register is set to zero. The program continues to a step 324 where the exit data for the first exit in the next state is retrieved. The program continues to a point C which loops control of the program back to step 302 in FIG. 3A.

Figure 3D:
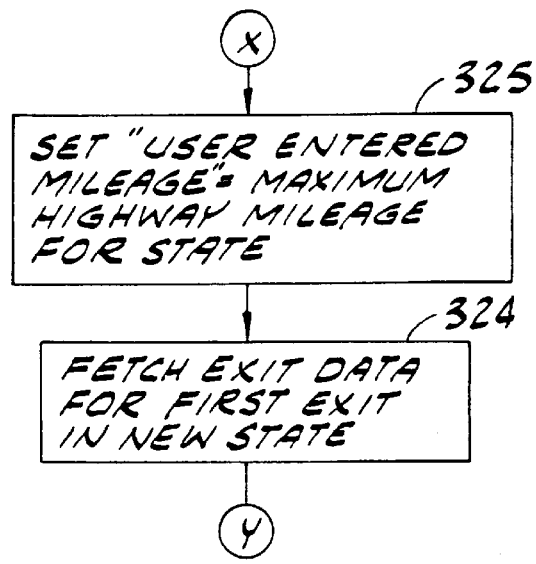
Figure 3C:
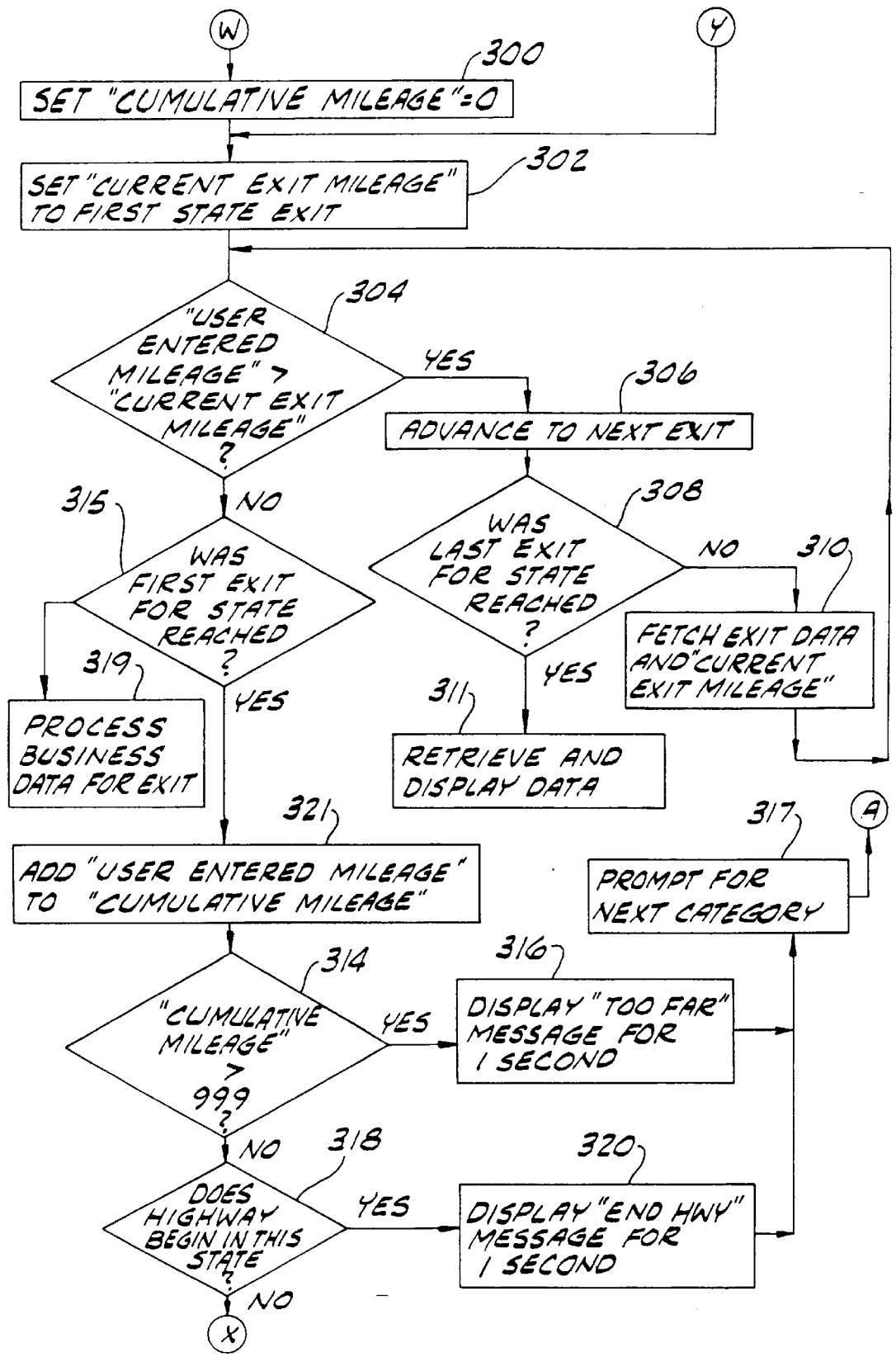

Referring now to FIGS. 3C and 3D, there is shown a flow chart of an exemplary program executed by microprocessor 46 for advancing to the exit table in the next state when the selected service is located in another state. In this instance, the program takes into account that the user is travelling in a reverse direction (i.e., successive mileage markers along the highway show decreasing mileage). Corresponding reference characters indicate program steps that are similar to the program steps shown in FIGS. 3A and 3B.

The program of FIGS. 3C and 3D also begins in a step 300 by setting a cumulative mileage register to zero. In a step 302, a current exit number register is set to the mileage marker number of the first exit. In a next step 304, microprocessor 46 determines whether the user-entered mileage is greater than the current exit mileage. If yes, then the program branches to a step 306. In step 306, the program advances to the next exit. In a next step 308, microprocessor 46 determines whether the last exit for the state has been reached. If no, the program branches to a step 310 where the exit data is retrieved and the current exit mileage register is updated. The program then loops back to step 304.

If microprocessor 46 determines in step 308 that the last exit in the state has been reached, the program branches to a step 311 to process the category selected by retrieving and displaying data. The control of the program then loops back to entry selection.

On the other hand, if in step 304 microprocessor 46 determines that the user-entered mileage is not greater than the current exit mileage, then the program branches to a step 315. In step 315, microprocessor 46 determines whether the first exit for the next step has been reached. If no, then the program branches to a step 319 to retrieve and display data for the exit. The control of the program then loops back to entry selection.

Once microprocessor 46 determines that the first exit in the state has been reached, the program branches to a step 321 because the user has requested exit data in the next contiguous state. In step 321, the cumulative mileage register is set equal to the distance from the user location (origin position) to the boundary or border between the states.

In a next step 314, microprocessor 46 determines whether the value in the cumulative mileage register is greater than 999. If it is, then the program branches to a step 316 where microprocessor 46 causes a "TOO FAR" message to be displayed for 1 second in display 26. According to the program, in a step 317, device 20 then prompts the user to enter or select a next category. After the user enters a new category, the program loops back to point W. On the other hand, if the cumulative mileage register is less than 999, then the program continues to a step 318. In step 318, microprocessor 46 determines whether the highway begins in the current state. If it does, then the program branches to a step 320 causing display 26 to display an "END HWY" message for 1 second. Following step 320, microprocessor 46 proceeds to step 317 of the program. If the highway does not begin in the state, the program continues to a point X in FIG. 3D. At point X the program continues to a step 325. In step 325, a user-entered mileage register is set to the maximum highway mileage for the state. The program continues to a step 324 where the exit data for the first exit in the next state is retrieved. The program continues to a point Y which loops control of the program back to step 302 in FIG. 3C.

Figure 4:
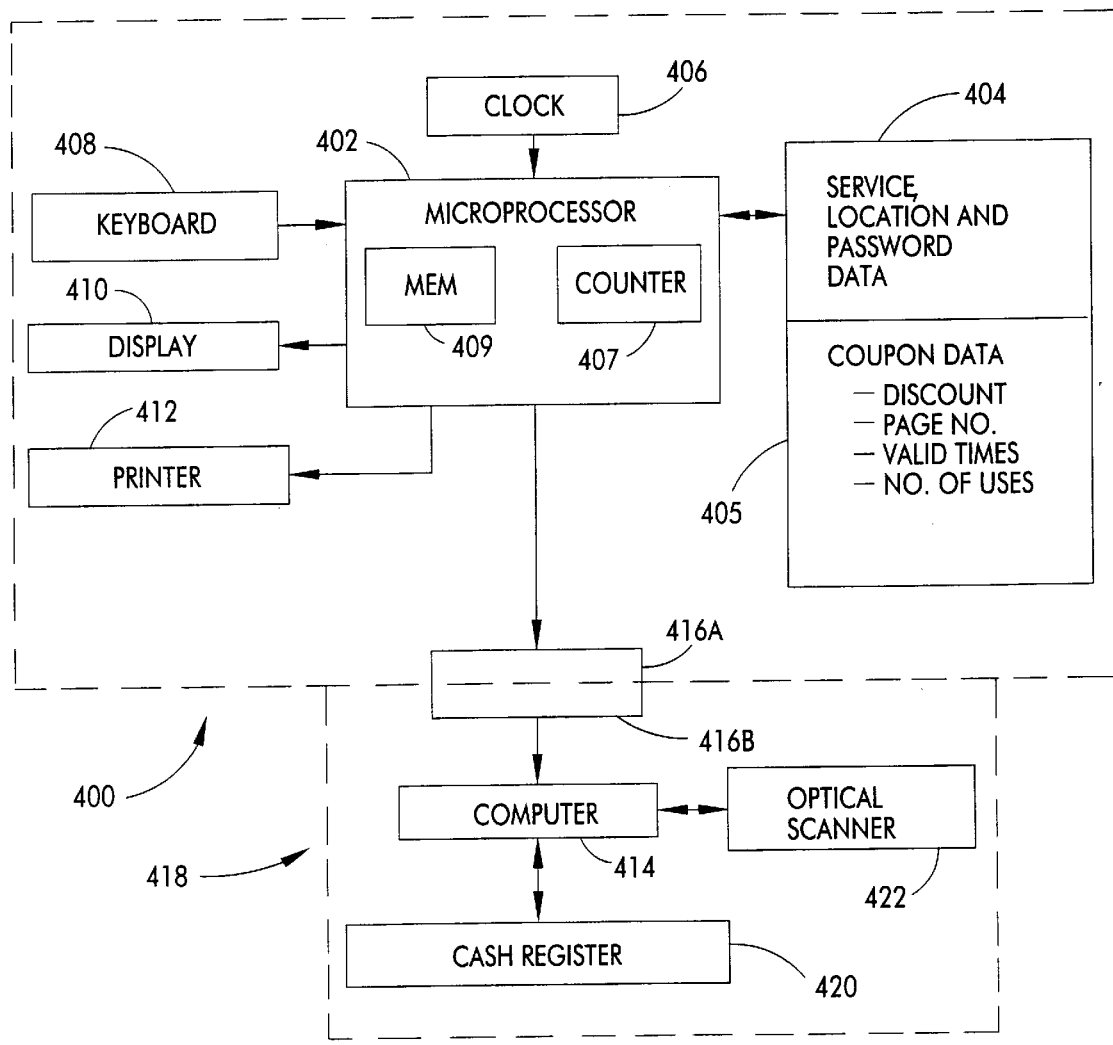
FIG. 4 is a block diagram of a data processing device of the present invention.

Referring now to FIG. 4, there is shown a block diagram of a hand-held unit 400 which electronically processes and displays discount information under the control of a microprocessor 402. The components of unit 400 are supported by a hand-held housing (not shown) similar to the housing 22 in FIG. 1. Unit 400 includes a first memory 404 for storing the names and locations of restaurants, motels, service stations, and other services. Preferably, the first memory 404 also includes a coupon data memory 405, which may be a part of first memory 404, storing data identifying which of the services offer a discount, the amount of the discount, and the valid period of the discount. The coupon data memory 405 also stores a number associated with each discount representing the number of times the discount may be used. Unit 400 also includes a clock 406 so that discounts can be entered as a function of the time of day. The clock 406 also keeps track of the month so that different discounts can be set up to be valid during different months.

In use, the user inputs data identifying the name of a desired service. The data is input to the microprocessor 402 via a keyboard 408, for example, through a data register found in a second memory 409 resident within microprocessor 402. If the service is a national chain, microprocessor 402 will retrieve all national discounts applicable to the service from coupon data memory 405. If the service is a national chain but the discount is specific to a particular store of the chain, the user inputs the name of the national chain plus an origin position corresponding to location information for the store. Then microprocessor 402 will retrieve all discounts applicable to the particular store from coupon data memory 405. If the service is a local shop, the user inputs the name and, again, microprocessor 402 retrieves all applicable discounts from coupon data memory 405. Alternatively, the user can input the name of a city, town, street or other location information for the origin position and a category of service and microprocessor 402 will retrieve from first memory 404 all services having a location corresponding to the origin position. Microprocessor 402 then outputs the services for display on a display 410. In circumstances where more services are retrieved than can be displayed at one time, the user scrolls through the list by repeatedly pressing a "display" button (not shown) on keyboard 408. The user selects a service by pressing a "select" button (not shown) on keyboard 408. Microprocessor 402 then retrieves coupon data representing discounts applicable to the selected service, thereby relating the coupon data to the service data.

After discounts have been retrieved, microprocessor 402 outputs the discounts for display on the display 410. If more discounts have been retrieved than can be displayed at one time, the user scrolls through the list by repeatedly pressing the "display" button on keyboard 408. The user selects a discount by pressing the "select" button on keyboard 408. If the user decides to use one of the discounts, the user can display the discount to the attendant at the service. Likewise, the user can depress a print button (not shown) on keyboard 408 to cause a printer 412 to print the discount on paper in the form of a coupon.

After a single-use discount has been displayed or printed for credit on a purchase, microprocessor 402 discards it from coupon data memory 405 of first memory 404. If the discount was printed by the printer 412 in the form of a coupon, microprocessor 402 automatically discards it from coupon data memory 405 of first memory 404. If the discount was received by displaying it to the service attendant on display 410, then the attendant enters a password for the service on keyboard 408. Microprocessor 402 checks the password against a password for the service stored in first memory 404 and, if a match is found, discards the displayed discount from coupon data memory 405. Alternatively, the password may be entered from a computer 414 in a remote corresponding device 418 located at the service by connection through a pair of matching connectors 416A and 416B.

Coupon data memory 405 also stores multiple use discounts by associating a number with each discount representing the permitted number of uses of the discount. After a multiple use discount is printed, microprocessor 402 automatically decrements the number associated with the discount. If the discount was received by displaying it to the service attendant on display 410, then the attendant enters a password for the service as described above and, again, microprocessor 402 decrements the number associated with the discount. Likewise, when the password is entered by the computer 414, microprocessor 402 decrements the number associated with the discount. After a given number reaches zero, microprocessor 402 discards the associated discount from coupon data memory 405. This prevents the discount from being displayed or printed any additional times. Alternatively, microprocessor 402 may increment a number after each coupon use to count the uses up to maximum, after which further discounts are unavailable.

In practice, microprocessor 402 discards a discount from coupon data memory 405 by either deleting it from memory 405 or by setting a disable signal associated with the discount in the random access memory ("RAM") portion of memory 405. When a discount is valid for only a limited period, for example the month of February or the morning hours of 9:00 a.m. to 12:00 p.m., a disable signal is stored in RAM associated with the discount. When the valid period begins, microprocessor 402 removes the disable condition until the end of the valid period. To prevent a user from resetting clock 406 to the valid period to thereby obtain discounts at other times, microprocessor 402 displays the time of day and month on display 410 so that the service attendant will know not to honor the discount other than during the valid period. When the discount is presented by connection to computer 414, the internal clock in computer 414 is used to check the valid period before honoring the discount. Microprocessor 402 thereby retrieves coupon data in the form of a discount as a function of the time of day information.

Preferably, coupon data memory 405 is a part of first memory 404 which includes a read only memory ("ROM") section for storing the names and locations of restaurants, motels, service stations, and other services and information as to which of the services offer a discount, the amount of the discount, and the valid period of the discount. First memory 404 further includes a nonvolatile RAM section for storing the number of uses associated with the multiple use discounts, for storing the disable signals, and for storing the passwords for the services. Nonvolatile RAM or similar technology allows the power to be removed from the unit without change in the status of a counter 407 which keeps track of the number of uses for multiple use discounts. The discount and service data is updated by replacing the ROM hardware (e.g., a memory chip) with updated ROM hardware. The data can also be updated by computer 414 through the connectors 416A and 416B, for example, at the time a purchase is made at a service. Some other computer (not shown) provided by an update service, for example, can also be used to update the discount and service data in first memory 404 through connectors 416A and 416B. When the discount and service updates are input from computer 414, the ROM section of first memory 404 should be implemented with RAM hardware. According to the invention, matching connectors 416A and 416B, in combination with computer 414, constitute means for interfacing and connecting with hand-held unit 400.

When computer 414 is used to update first memory 404, it sends an update signal to microprocessor 402 via matching connectors 416A and 416B. Some type of security commonly known to those skilled in the art, such as a password, is preferably implemented to prevent unauthorized updating. Microprocessor 402 responds to the update signal from computer 414 by enabling first memory 404 to receive the updated data from computer 414. The updated data is transmitted from computer 414 to microprocessor 402 and stored in first memory 404 for use in future processing. After the updating is complete, microprocessor 402 turns off the update signal.

In addition to computer 414, the corresponding device 418 may also include a cash register 420 for summing the amount due on products purchased by a purchaser and an optical scanner 422 for reading the identifying codes which commonly appear on products. Computer 414 thereby monitors the purchased products. Computer 414 also monitors the coupon data stored in first memory 404 of hand-held unit 400 which data relates to the service where the particular corresponding device 418 is located. Computer 414 matches all available discounts identified by the coupon data with all applicable products identified for purchase through the cash register 420 and/or optical scanner 422. Computer 414 transmits the available discounts to cash register 420 which deducts the value of the discounts from the amount due. Again, all single-use discounts are discarded from first memory 404. When multiple use discounts are used, the number associated with the discounts is decremented as described above.

For applications where the quantity of discount and service data to be stored in first memory 404 is too great for conventional storage apparatus, the data compression, searching and retrieval system described above for FIGS. 1 through 3D are used to expand the capacity of first memory 404. Using this data compression system, the discount and service data are stored in first memory 404 as coded numbers. Microprocessor 402 further codes the data input through keyboard 408 as coded numbers. Microprocessor 402 searches the coded numbers in first memory 404 as a function of the coded numbers representing the input data to retrieve coded numbers corresponding to the desired discount and service data. Microprocessor 402 expands the retrieved coded numbers into a user-readable form which is displayed on display 410.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for providing data related to discounted services available near a given location, said system comprising:

a book of coupons corresponding to the discounted services;

a memory storing compressed service data representative of a plurality of services in various locations and compressed coupon data representative of discounts available for the services, said services being categorized by type of service, said coupon data including identifying numbers identifying locations of coupons within the coupon book corresponding to the discounts available for the services;

a data entry circuit for receiving and compressing input data identifying a desired category of services and the given location;

a microprocessor, receiving and responsive to the compressed input data, for selectively retrieving the service data and coupon data from the memory and for expanding the retrieved service data and coupon data into a user-readable form, said retrieved service data representing one or more selected services in the desired category near the given location and said retrieved coupon data representing the discounts available for the selected services including the identifying numbers of the coupons in the coupon book corresponding to the available discounts; and a display for displaying the expanded retrieved service data and coupon data.

2. The system of claim 1 wherein the retrieved service data and coupon data comprise a coded number and wherein the microprocessor converts the coded number into the name of a service and a discount available for the service thereby expanding the retrieved service data and coupon data.

3. The system of claim 1 wherein the compressed input data comprises a coded number representative of the name of the desired category of services and the given location.

4. A system for providing data related to discounts available for selected services, said system comprising:

a book of coupons corresponding to the discounts;

a memory storing compressed coupon data representative of discounts available for a plurality of services, each of said discounts being related to at least one of the services, said coupon data including identifying numbers identifying locations of coupons within the coupon book corresponding to the discounts available for the services;

a data entry circuit for receiving and compressing input data identifying a selected service;

a microprocessor, receiving and responsive to the compressed input data, for selectively retrieving the coupon data from the memory and for expanding the retrieved coupon data into a user-readable form, said retrieved the coupon data representing the discounts available for the selected service including the identifying numbers of the coupons in the coupon book corresponding to the available discounts; and a display for displaying the expanded retrieved coupon data.

5. A data processing system for providing data related to a plurality of discounted services available within a given location, the system comprising:

means for storing in compressed form service data identifying a plurality of services available in various locations and coupon data identifying discounts available for various services;

means for relating the discounts identified by the coupon data to the services identified by the service data;

a memory;

means for entering input data in the memory identifying a desired category of service and the given location;

means for compressing the input data identifying the desired category of services and the given location;

means for retrieving from the storing means compressed and as a function of the compressed input data service data representing one or more services near the given location and for retrieving from the storing means the related discounts identified by the compressed coupon data representing discounts available for the retrieved services;

means for expanding the retrieved compressed service data and retrieved compressed coupon data into a user readable form; and means for displaying the expanded retrieved service data and the expanded retrieved coupon data including the discounts related to the retrieved service data.

6. The system of claim 5 further comprising a clock providing time of day information, wherein the storing means comprises means for storing the coupon data as a discount as a function of time of day information, and wherein the retrieving means comprises means for retrieving the coupon data as a function of the time of day information.

7. The system of claim 5 wherein the displaying means further comprises means for displaying the coupon data as a discount and wherein the system further comprises means for associating a number with each discount representing a permitted number of uses of the discount, means for incrementing or decrementing the number for each discount when the discount is displayed to receive the related service, and means, responsive to the associating means, for preventing a discount from being displayed when the number associated with the discount is a predetermined number.

8. The system of claim 7 wherein the associating means further comprises means for inputting into the storing means a password as a function of a service, and wherein the incrementing or decrementing means is responsive to the entered password for incrementing or decrementing the number associated with the discount for the service.

9. The system of claim 5 wherein the displaying means further comprises means for displaying the coupon data as a discount and wherein the system further comprises means for discarding a particular coupon data from the storing means in response to the particular coupon data being retrieved from the storing means for the user to receive the discount.

10. The system of claim 5 wherein the displaying means comprises a paper printer for printing a coupon on a paper, the printed coupon identifying the retrieved service and the discount applicable to the retrieved service.

11. The system of claim 10 further comprising means for discarding a particular coupon data from the storing means in response to the printer printing the particular coupon data.

12. The system of claim 5 wherein the compressing means comprises means for converting the name of the desired category of service and the given location into a coded number.

13. The system of claim 5 wherein the retrieved compressed service data and the coupon data include a coded number and wherein the expanding means comprises means for converting the coded number into the name of a service and a discount available for the service.

14. The system of claim 5 for use with a book of coupons corresponding to the discounts applicable to the services, wherein the storing means comprises means for storing coupon data in the form of a coupon number identifying each of the coupons in the book, and wherein the retrieving means comprises means for retrieving the coupon number for the coupon in the book applicable to the desired service.

15. The system of claim 14 wherein the coupon number is representative of a page of the coupon book whereby the location of the coupon within the book is identified.

16. The system of claim 5 further comprising a hand-held device, said storing means, input data entering means, retrieving and expanding means and displaying means being part of the hand-held device, and further comprising a remote device located at each of the services, said remote device comprising:

means for connecting and interfacing with the hand-held device; and means for discarding from the storing means of the hand-held device connected to the remote device a coupon data related to the service.

17. The system of claim 16 wherein the remote device comprises means for providing updated data and wherein the hand-held device comprises means for receiving the provided updated data to update the data stored in the storing means.

18. The system of claim 16 wherein the remote device further comprises:

a cash register for summing the amount due on products purchased by a purchaser;

means for monitoring the coupon data stored in the storing means of the hand-held device which data relates to the service where the particular corresponding device is located;

means responsive to the monitoring means for matching discounts identified by the coupon data which correspond to the purchased products; and means responsive to the matching means for deducting the value of the available discounts from the amount due.

* * * * *